United States Patent
Choi et al.

(10) Patent No.: US 12,281,909 B1
(45) Date of Patent: Apr. 22, 2025

(54) METHOD AND SYSTEM FOR INDUCING EVACUATION THROUGH CREATION OF EVACUATION ROUTE IN DISASTER ENVIRONMENTS

(71) Applicant: CORNERS CO., LTD., Seoul (KR)

(72) Inventors: Jang Won Choi, Seoul (KR); Dong Oh Kim, Seoul (KR)

(73) Assignee: CORNERS CO., LTD., Seoul (KR)

( * ) Notice: Subject to any disclaimer, the term of this patent is extended or adjusted under 35 U.S.C. 154(b) by 0 days.

(21) Appl. No.: 18/586,752

(22) Filed: Feb. 26, 2024

(30) Foreign Application Priority Data

Jan. 17, 2024 (KR) .................. 10-2024-0007535

(51) Int. Cl.
 *G01C 21/34* (2006.01)
(52) U.S. Cl.
 CPC ..... *G01C 21/3461* (2013.01); *G01C 21/3492* (2013.01)
(58) Field of Classification Search
 CPC ............... G01C 21/3461; G01C 21/3492
 See application file for complete search history.

(56) References Cited

U.S. PATENT DOCUMENTS

| 2007/0279210 | A1* | 12/2007 | Li | G08B 7/062 |
| | | | | 702/22 |
| 2017/0316538 | A1* | 11/2017 | Tadano | G01C 21/26 |
| 2018/0017392 | A1* | 1/2018 | Claudel | G01C 23/00 |
| 2018/0096573 | A1* | 4/2018 | Tadano | G08B 27/00 |
| 2020/0155881 | A1* | 5/2020 | Tohidi | G06F 16/9038 |

FOREIGN PATENT DOCUMENTS

| KR | 10-2017-0053902 A | 5/2017 |
| KR | 10-2021-0050715 A | 5/2021 |
| KR | 10-2362295 B1 | 2/2022 |

OTHER PUBLICATIONS

Written Decision on Registration dated Oct. 8, 2024, issued in counterpart KR patent application No. 10-2024-0007535 with English translation (2 pages).
Request for the Submission of an Opinion dated Apr. 2, 2024, issued in counterpart KR patent application No. 10-2024-0007535 with English translation (16 pages).

* cited by examiner

*Primary Examiner* — Khoi H Tran
*Assistant Examiner* — Tristan J Greiner
(74) *Attorney, Agent, or Firm* — WHDA, LLP

(57) ABSTRACT

An evacuation inducing method and system are disclosed. The evacuation inducing method includes: detecting the location of an emergency situation in a target region; generating prediction data for each unit path included in the target region, which predicts until when each unit path will remain safe, by predicting a spread of the emergency situation from the location of the emergency situation by using a spread prediction algorithm; predicting the degree of congestion on each unit path included in the target region and the expected travel time by taking into consideration the number of objects included in the target region that is preliminarily identified; creating an evacuation route based on the prediction data, the degree of congestion on each unit path, and the expected travel time; and initiating guidance for distributing and evacuating the objects based on the created evacuation route.

6 Claims, 12 Drawing Sheets

METHOD AND SYSTEM FOR INDUCING EVACUATION THROUGH CREATION OF EVACUATION ROUTE IN DISASTER ENVIRONMENTS

CROSS-REFERENCES TO RELATED APPLICATIONS

This application is based on and claims priority under 35 U.S.C. 119 to Korean Patent Application No. 10-2024-0007535, filed on Jan. 17, 2024 in the Korean intellectual property office, the disclosures of which are herein incorporated by reference in their entireties.

TECHNICAL FIELD

The following description relates to a method and system for inducing evacuation through creation of an evacuation route in disaster environments.

BACKGROUND OF THE DISCLOSURE

In general, for multi-use premises, there are standards for installing emergency evacuation systems which are established in case of disasters such as fires or floods. In particular, firefighting facilities are installed to guide evacuation through exits using emergency lighting and speakers, in order to induce evacuation in case of fire. These emergency evacuation systems are intended to quickly alert people to the situation in case of disaster, safely and promptly evacuate evacuees, and suppress the disaster situation at an early stage in order to minimize damage to lives and property.

However, such emergency evacuation systems are only able to prompt users to escape from premises such as buildings, and there are difficulties in using them to evacuate the users in case of outdoor disasters such as forest fires, floods, and tornados. Another problem is that, although there exist technologies that provide users with an emergency disaster message involving information on nearby shelters, it is difficult to induce evacuation in the process, which means that the users have to get to the shelters on their own based on the information in the message.

For example, if a traffic congestion occurs after a vehicle gets on a road, it will not be easy for the vehicle to get out of it, placing it in a dangerous situation. Therefore, preliminary guidance is required to predict a spread of the disaster, traffic jams, etc. before evacuation begins.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure provides a method and system for inducing evacuation, capable of distributing and guiding users along a safe route, on the basis of first prediction data, which predicts the degree of congestion on each unit path in a road network with respect to each disaster and the expected travel time, based on the number of objects (for example, the population or the number of registered means of transportation (e.g., vehicles)) in a target region (e.g., a particular city) that is preliminarily identified, and second prediction data, which predicts until when each unit path in the target region will remain safe through prediction of a spread of the disaster.

An exemplary embodiment of the present disclosure provides an evacuation inducing method performed by a computer device, the method comprising: detecting the location of an emergency situation in a target region; generating prediction data for each unit path included in the target region, which predicts until when each unit path will remain safe, by predicting a spread of the emergency situation from the location of the emergency situation by using a spread prediction algorithm; predicting the degree of congestion and the expected travel time, on each unit path included in the target region, by taking into consideration the number of objects included in the target region that is preliminarily identified; creating an evacuation route based on the prediction data, the degree of congestion on each unit path, and the expected travel time; and initiating guidance for distributing and evacuating the objects based on the created evacuation route.

According to one aspect, each unit path may correspond to a travel path between a plurality of stations that are installed at different locations in the target region so that objects located in the target region are evacuated from the target region.

According to another aspect, the spread prediction algorithm may include an algorithm for predicting the pathway and speed of spread of the emergency situation, wherein, in the generating of prediction data, prediction data may be generated that includes information on a point in time when at least one of the unit paths included in the target region is disabled depending on the pathway and speed of spread of the emergency situation.

According to another aspect, the degree of congestion may be determined based on the number of objects each unit path in the target region can accommodate per unit time.

According to another aspect, the expected travel time may be determined based on the time taken for the objects to travel along each unit path included in the target region.

According to another aspect, in the creating of an evacuation route, the plurality of stations installed at different locations in the target region may be configured as nodes, and an evacuation route is created based on a given graph in which travel paths present between some of the stations in the target region is configured as edges.

According to another aspect, the creating of an evacuation route may comprise generating a time-reflecting graph including intergraph edges between nodes included in a previous unit time graph and a current unit time graph, based on the given graph.

According to another aspect, the intergraph edges may include: a hold edge between a first node included in the previous unit time graph and a second node corresponding to the first node and included in the current unit time graph; and a path edge between at least one fourth node included in the current unit time graph and the first node, with the at least one fourth node corresponding to at least one third node between which and a node corresponding to the first node there exits an edge on the graph.

According to another aspect, in the initiating of guidance, guidance for distributing and evacuating the objects may be initiated through a plurality of stations installed at different locations in the target region.

According to another aspect, the evacuation inducing method may further comprise updating the evacuation route by updating the prediction data, the degree of congestion on each unit path, and the expected travel time at preset unit time intervals.

Another exemplary embodiment of the present disclosure provides a computer program that is combined with a computer device and stored in a computer-readable recording medium in order to execute the method on the computer device.

Another exemplary embodiment of the present disclosure provides a computer-readable recording medium storing a computer program for executing the method.

Another exemplary embodiment of the present invention provides a compute device comprising at least one processor configured to execute computer-readable instructions, wherein, by the at least one processor, the location of an emergency situation in a target region is detected, prediction data for each unit path included in the target region, which predicts until when each unit path will remain safe, is generated by predicting a spread of the emergency situation from the location of the emergency situation by using a spread prediction algorithm, the degree of congestion on each unit path included in the target region and the expected travel time are predicted by taking into consideration the number of objects included in the target region that is preliminarily identified, an evacuation route is created based on the prediction data, the degree of congestion on each unit path, and the expected travel time, and guidance for distributing and evacuating the objects is initiated based on the created evacuation route.

It is possible to distribute and guide users along a safe route, on the basis of first prediction data, which predicts the degree of congestion on each unit path in a road network with respect to each disaster and the expected travel time, based on the number of objects (for example, the population or the number of registered means of transportation (e.g., vehicles)) in a target region (e.g., a particular city) that is preliminarily identified, and second prediction data, which predicts until when each unit path in the target region will remain safe through prediction of a spread of the disaster.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, embodiments will be described in detail with reference to the accompanying drawings.

An evacuation inducing system according to embodiments of the present disclosure may be implemented by at least one computer device. In this case, a computer program according to an embodiment of the present disclosure may be installed and driven in the computer device. The computer device may perform an evacuation inducing method according to embodiments of the present disclosure under the control of the driven computer program. The computer program may be combined with the computer device and stored in a computer-readable recording medium in order to execute the evacuation inducing system in the computer device.

Figure 1:
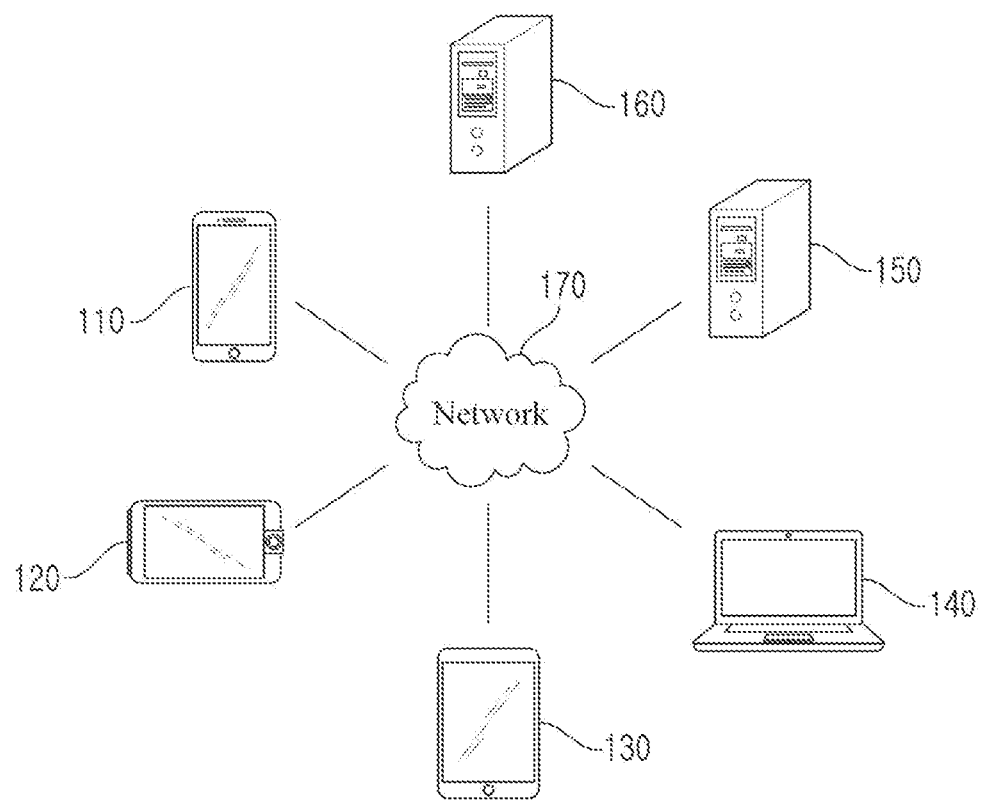
FIG. 1 is a diagram illustrating an example of a network environment according to an embodiment of the present disclosure.

FIG. 1 is a diagram illustrating an example of a network environment according to an embodiment of the present disclosure. The network environment of FIG. 1 illustrates an example including a plurality of electronic devices 110, 120, 130, and 140, a plurality of servers 150 and 160, and a network 170. FIG. 1 is an example for describing the present disclosure, and the number of electronic devices or the number of servers is not limited to that of FIG. 1. Furthermore, the network environment merely describes one of environments applicable to the present embodiments, and an environment applicable to the present embodiments is not limited to the network environment of FIG. 1.

Each of the plurality of electronic devices 110, 120, 130 and 140 may be a stationary terminal or a mobile terminal implemented as a computer device. For example, the plurality of electronic devices 110, 120, 130, and 140 may include a smartphone, a mobile phone, a navigation device, a computer, a laptop computer, a device for digital broadcasting, personal digital assistants (PDA), a portable multimedia player (PMP), a tablet PC, etc. For example, in FIG. 1, a shape of a smartphone is illustrated as being an example of the electronic device 110. However, in embodiments of the present disclosure, the electronic device 110 may mean one of various physical computer devices capable of communicating with other electronic devices 120, 130, and 140 and/or the servers 150 and 160 over the network 170 substantially using a wireless or wired communication method.

The communication method is not limited, and may include short-distance wireless communication between devices in addition to communication methods using communication networks (e.g., a mobile communication network, wired Internet, wireless Internet, and a broadcasting network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as a computer device or a plurality of computer devices, which provides an instruction, a code, a file, content, or a service through communication with the plurality of electronic devices 110, 120, 130, and 140 over the network 170. For example, the server 150 may be a system that provides the plurality of electronic devices 110, 120, 130, and 140 with services over the network 170.

Figure 2:
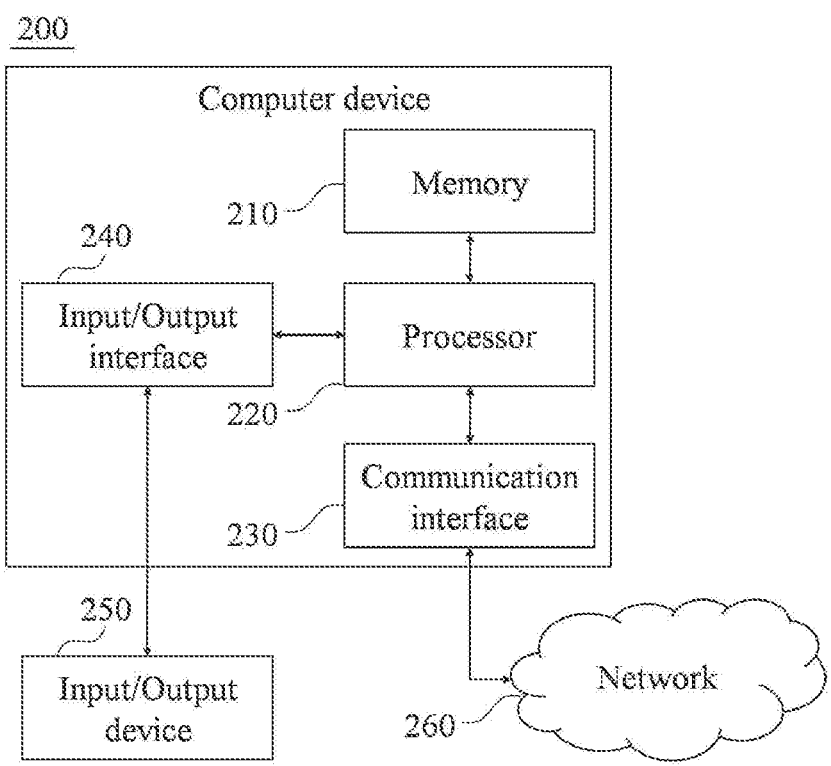
FIG. 2 is a block diagram illustrating an example of a computer device according to an embodiment of the present disclosure.

FIG. 2 is a block diagram illustrating an example of a computer device according to an embodiment of the present disclosure. Each of the plurality of electronic devices 110, 120, 130, and 140 or each of the servers 150 and 160 may be implemented as a computer device 200 illustrated in FIG. 2.

As illustrated in FIG. 2, the computer device 200 may include a memory 210, a processor 220, a communication interface 230, and an input/output (I/O) interface 240. The memory 210 is a computer-readable medium, and may include a permanent mass storage device, such as a random access memory (RAM), a read only memory (ROM) and a disk drive. In this case, the permanent mass storage device, such as a ROM and a disk drive, may be included in the computer device 200 as a permanent storage device separated from the memory 210. Furthermore, an operating system and at least one program code may be stored in the memory 210. Such software components may be loaded from a computer-readable medium separated from the memory 210, to the memory 210. Such a separate computer-readable medium may include computer-readable recording media, such as a floppy drive, a disk, a tape, a DVD/CD-ROM drive, and a memory card. In another embodiment, the software components may be loaded onto the memory 210, not through a computer-readable recording medium, but through the communication interface 230. For example, the software components may be loaded onto the memory 210 of the computer device 200 based on a computer program installed by files received over the network 170.

The processor 220 may be configured to process instructions of a computer program by performing basic arithmetic, logic, and input/output (I/O) operations. The instructions may be provided to the processor 220 by the memory 210 or the communication interface 230. For example, the processor 220 may be configured to execute received instructions based on a program code stored in a recording device, such as the memory 210.

The communication interface 230 may provide a function for enabling the computer device 200 to communicate with other devices (e.g., the aforementioned storage devices) over the network 170. For example, a request, a command, data, a file, etc. generated by the processor 220 of the computer device 200 according to a program code stored in a recording device, such as the memory 210, may be provided to other devices over the network 170 under the control of the communication interface 230. Inversely, a signal, a command, data, a file, etc. from another device may be received by the computer device 200 through the communication interface 230 of the computer device 200 over the network 170. A signal, a command, data, etc. received through the communication interface 230 may be transmitted to the processor 220 or the memory 210, and a file received through the communication interface 230 may be stored in a storage medium (e.g., the aforementioned permanent storage device) which may be further included in the computer device 200.

The I/O interface 240 may be a means for interfacing with input/output devices 250. For example, the input device may include a device, such as a microphone, a keyboard, or a mouse. The output device may include a device, such as a display or a speaker. For another example, the I/O interface 240 may be a means for interfacing with a device in which functions for input and output are integrated into one, such as a touch screen. At least one of the I/O devices 250, together with the computer device 200, may be configured as a single device. For example, as in a smartphone, a touchscreen, a microphone, a speaker, etc. may be implemented as being included in the computer device 200.

Furthermore, in other embodiments, the computer device 200 may include components fewer or more components than those of FIG. 2. However, it is not necessary to clearly illustrate most of conventional components. For example, the computer device 200 may be implemented to include at least some of the I/O devices 250, or may further include other components, such as a transceiver and a database.

Figure 3:
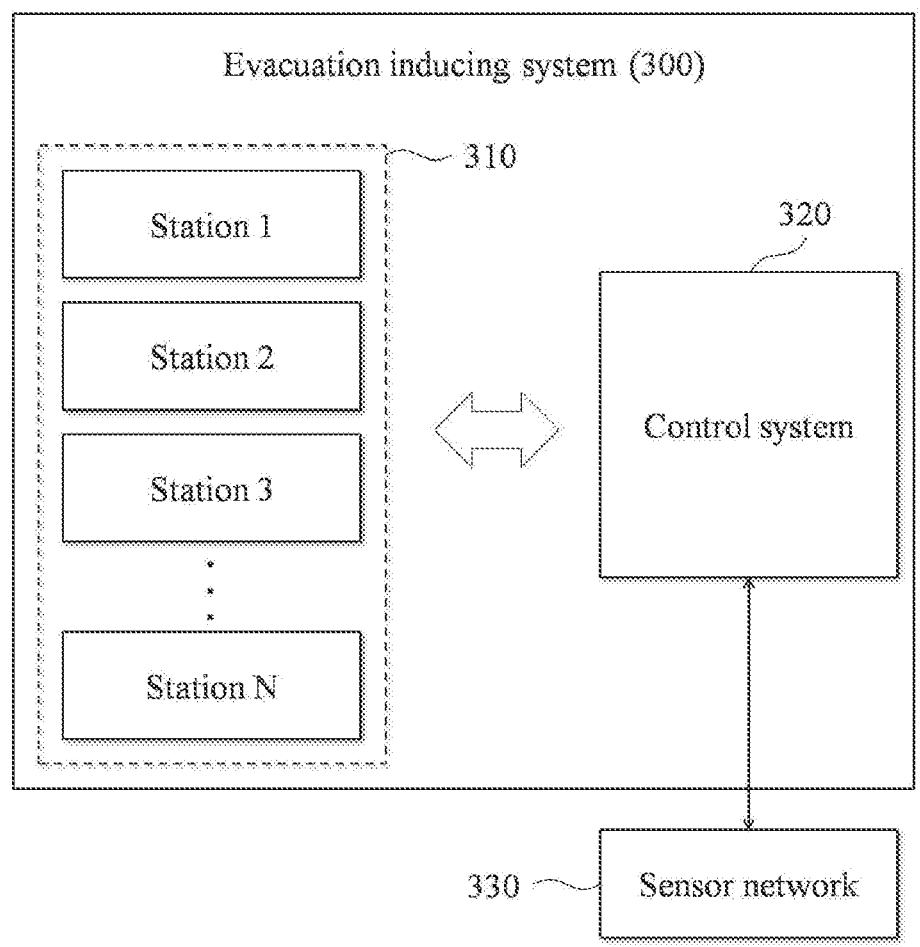
FIG. 3 is a diagram illustrating an exemplary overall view of an evacuation inducing system according to an embodiment of the present disclosure.

FIG. 3 is a diagram illustrating an exemplary overall view of an evacuation inducing system according to an embodiment of the present disclosure. The evacuation inducing system 300 according to the present embodiment may include a plurality of stations 310 respectively installed at a plurality of locations present in a target region and a control system 320 for controlling the plurality of stations 310.

The plurality of stations 310 and the control system 320 may be interconnected over a network (e.g., the network 170) and send and receive a predetermined signal or data.

Moreover, each of the plurality of stations 310 may perform ad-hoc network communication with other stations. For example, each of the plurality of stations 310 may prevent a particular station from failing to be properly controlled due to an interruption of communication between the particular station and the control system 320, by communicating with the control system 320 directly or via a predetermined intermediary system at normal times and performing ad-hoc networking with one another at times of emergency.

In one embodiment, the plurality of stations 310 may be electronic devices that are installed in a distributed manner across a target region (e.g., a city or road network) and detect emergency situation information including the occurrence of an emergency situation and the location of the emergency situation, transmit the detected emergency situation information to the control system 320, and provide objects with evacuation guidance information according to control from the control system 320.

According to the embodiment, the plurality of stations 310 may only perform a function of providing objects with evacuation guidance information, and the occurrence of an emergency situation in a target region and the location of the emergency situation may be detected through a separate sensor network 330 and transmitted to the control system 320. The sensor network 330 may include a network of various sensors including a flame sensor, a smoke sensor, a fine dust sensor, a temperature sensor, and/or a humidity sensor.

Each of the plurality of stations 310 may perform a function of presenting an evacuation route allowing for evacuation of objects at the current point in time from their location. According to an embodiment, each of the plurality of stations 310 may present an evacuation route by outputting visual information and/or audio information, and certain components (e.g., a display, a lighting device, a speaker, an audio player, etc.) may be provided for this purpose. For example, each of the plurality of stations 310 may include a device capable of displaying a predetermined direction (e.g., an arrow or the like corresponding to an evacuation route). In this case, each station may present an evacuation route allowing for evacuation of objects through a visually identifiable sign indicating a direction from their location according to control from the control system 320. For another example, each of the plurality of stations 310 may include a predetermined lighting device, and this lighting device may be used to guide objects through an evacuation route, or lighting may be provided near the station to guide the evacuation of the objects. For example, the lighting device may be a directional lighting device, and it may produce directional light toward a route that should be taken to escape according to control from the control system 320, thereby enabling objects to escape from their position toward the direction the light is produced. Needless to say, a non-directional lighting device, instead of a directional lighting device, may be provided if it is merely intended to provide light near the station.

Moreover, each of the plurality of stations 310 may have a sensing means for sensing a certain emergency situation (e.g., a fire, a flood, an earthquake, and other situations requiring evacuation). Such a sensing means may be implemented by providing at least one of various sensors including a flame sensor, a smoke sensor, a fine dust sensor, a temperature sensor, and/or a humidity sensor depending on the emergency situation.

Furthermore, in some embodiments, each of the plurality of stations 310 may further include an image acquisition means for acquiring an image of a location where the station is installed. Image information acquired through the image acquisition means may be identified by the control system 320 and/or an administrator of the control system 320, whereby unnecessary evacuations caused by malfunctioning of the sensors may be prevented. Also, when the occurrence of an actual emergency situation is detected through acquired image information, it may be dealt with according to visually accurate situation information. The image acquisition means may be implemented by a camera capable of panning, tilting, and zooming. Also, if each of the plurality of stations 310 has an image acquisition means, it is possible to identify the number of objects located at each of the plurality of stations 310 at the time when evacuation is actually started, the number of objects at a certain location during evacuation, and so on.

The control system 320 may detect the occurrence of an emergency situation and the location of the emergency situation through at least one of the plurality of stations 310 and/or the sensor network 330. To this end, any of the plurality of stations 310 (or any sensor in the sensor network) that detects the emergency situation may transmit information needed for identifying it to the control system 320, and thereby the control system 320 may determine the location of the emergency situation.

In this case, the control system 310 may determine an evacuation route (e.g., an evacuation route selected for each route in the road network) with respect to each disaster, based on the number of objects (for example, the population and/or the number of vehicles) in a target region (e.g., a city area) that is preliminarily identified, determine the evacuation route by taking prediction data into further consideration which predicts until when the evacuation route of the target region will remain safe through prediction of a spread of the disaster, and generate a control signal for distributing and guiding users along the determined evacuation route.

Moreover, the control system 320 may perform a function of outputting a control signal to the plurality of stations 310 so that each of the plurality of stations 310 outputs guidance information in accordance with the control signal. As described above, the guidance information may be provided to objects by outputting visual information and/or audio information.

The control signal may include target station identification information and/or guidance identification information for identifying guidance information outputted by the target station. In a case where the target station identification information is included in the control signal, if the control signal is transmitted to the target station through an ad-hoc network between the plurality of stations 310, only the target station corresponding to the target station identification information may output the guidance information in accordance with the corresponding control signal. Needless to say, if the control system 320 and a particular station communicates with each other directly or via a predetermined intermediary system (e.g., a gateway or the like), such target station identification information may not be included in the control signal. The intermediary system may be selectively applied in consideration of the capability of communication between the control system 320 and the plurality of stations 310 and the width of the target region.

The guidance identification information may be information for distinguishing guidance information outputted by each station. Each of the plurality of stations 310 may store in a predetermined storage module a plurality of pieces of guidance information that can be outputted by themselves, and upon receiving a control signal, may output guidance information corresponding to the guidance identification information, among the guidance information stored in the storage module.

Figure 4:
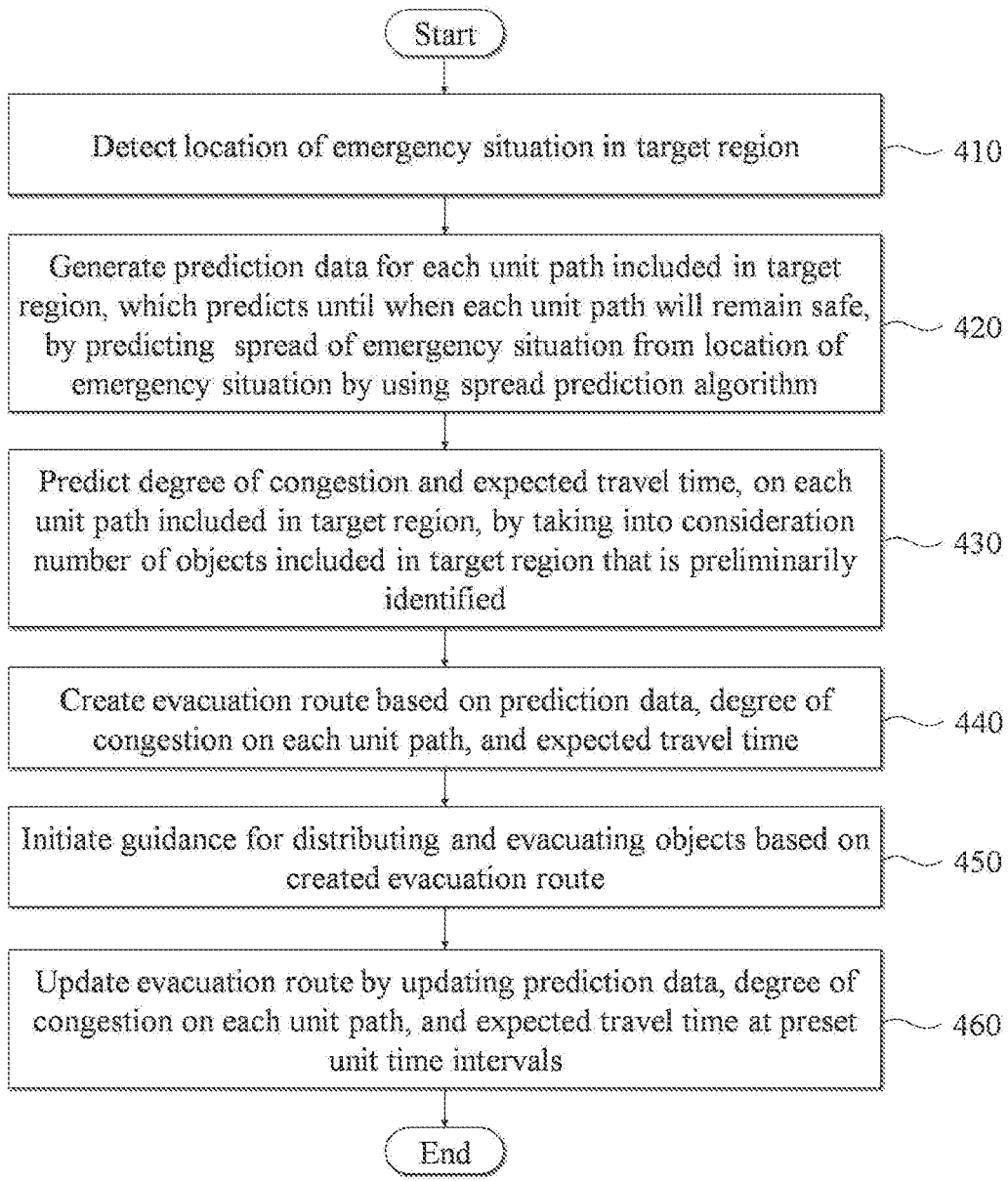
FIG. 4 is a flowchart illustrating an example of an evacuation inducing method according to an embodiment of the present disclosure.

FIG. 4 is a flowchart illustrating an example of an evacuation inducing method according to an embodiment of the present disclosure. The evacuation inducing method according to the present embodiment may be performed by the aforementioned computer device 200 which implements the control system 320. In this case, the processor 220 of the computer device 200 may be implemented to execute a control instruction according to a code of an operating system or a code of at least one program included in the memory 210. In this case, the processor 220 may control the computer device 200 to execute the steps 410 to 460 included in the method of FIG. 4 in response to the control instruction provided by the code stored in the computer device 200.

In the step 410, the computer device 200 may detect the location of an emergency situation in a target region. For example, the target region may refer to a region such as a particular city. In this case, a plurality of stations 310 may be installed and operated in a road network of this city. In this case, the computer device 200 may detect the location of an emergency situation by receiving emergency situation information including the occurrence of an emergency situation and the location of the emergency situation from at least one of the plurality of stations 310 and/or at least one of the sensors included in a separate sensor network 330.

In the step 420, the computer device 200 may generate prediction data for each unit path included in the target region, which predicts until when each unit path will remain safe, by predicting a spread of the emergency situation from the location of the emergency situation by using a spread prediction algorithm. Here, each unit path may correspond to a travel path between a plurality of stations that are installed at different locations in the target region so that objects located in the target region are evacuated from the target region. For example, in a case where a plurality of stations 310 are installed in a road network, if there is a travel path between the stations that allows for evacuation of objects, this travel path may become a unit path. In other words, such a unit path may correspond to an edge of a graph to be described later. Moreover, the spread prediction algorithm may include an algorithm for predicting the pathway and speed of spread of the emergency situation. In this case, the computer device 200 may generate prediction data including information on a point in time when at least one of the unit paths included in the target region is disabled depending on the pathway and speed of spread of the emergency situation. For example, at a point in time when a unit path corresponding to a certain edge is disabled, this edge may be dynamically configured as a disable edge which is disabled from the graph.

In the step 430, the computer device 200 may predict the degree of congestion on each unit path included in the target region and the expected travel time by taking into consideration the number of objects included in the target region that is preliminarily identified. The degree of congestion may be determined based on the number of objects each unit path in the target region can accommodate per unit time. The degree of congestion may correspond to a capacity to be described later. Also, the expected travel time may be determined based on the time taken for the objects to travel along each unit path included in the target region. The expected travel time may correspond to a cost to be described later.

In the step 440, the computer device 200 may create an evacuation route based on prediction data and the degree of congestion on each unit path and the expected travel time. For example, the computer device 200 may configure the plurality of stations installed at different locations in the target region as nodes, and create an evacuation route based on a given graph in which travel paths present between some of the stations in the target region is configured as edges. In some embodiments, the computer device 200 may generate a time-reflecting graph including intergraph edges, which are edges between nodes included in a previous unit time graph and nodes included in a current unit time graph, based on the given graph, in order to reflect the passage of time and adaptively create the current most efficient evacuation route over time. In this case, the intergraph edges may include a hold edge between a first node included in the previous unit time graph and a second node corresponding to the first node and included in the current unit time graph, and a path edge between at least one fourth node included in the current unit time graph and the first node, with the at least one fourth node corresponding to at least one third node between which and a node corresponding to the first node there exits an edge on the given graph. An example of how such a graph is given, how a time-reflecting graph is generated based on the given graph, and how an evacuation route is created based on the graph will be described in more detail later.

In the step 450, the computer device 200 may initiate guidance for distributing and evacuating the objects based on the created evacuation route. For example, the computer device 200 may initiate guidance for distributing and evacuating objects through a plurality of stations installed at different locations in the target region.

In the step 460, the computer device 200 may update the evacuation route by updating the prediction data, the degree of congestion on each unit path, and the expected travel time at preset unit time intervals. The computer device 200 may continue to give guidance for distributing and evacuating objects through an updated evacuation route.

Figure 5:
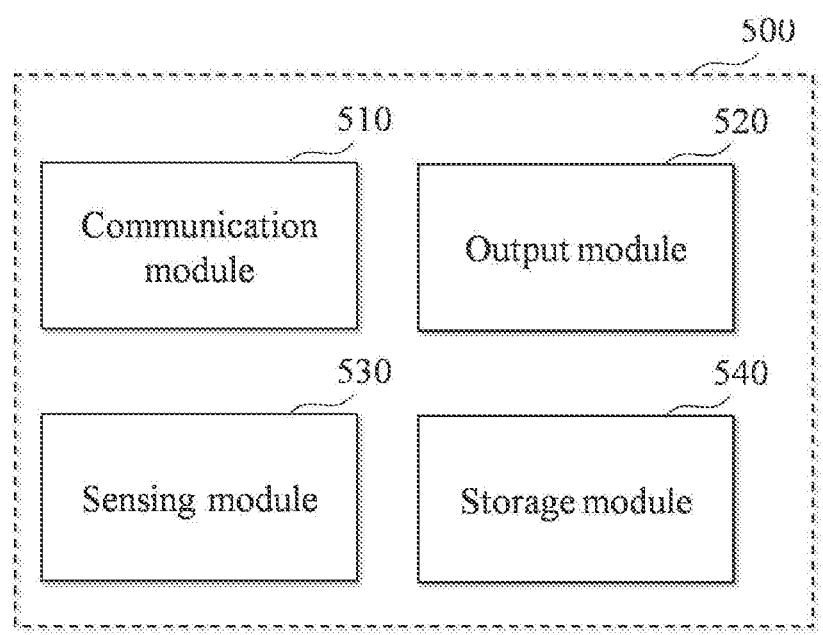
FIG. 5 is a block diagram illustrating an example of an internal configuration of a station according to the present disclosure.

FIG. 5 is a block diagram illustrating an example of an internal configuration of a station according to the present disclosure. The station 500 according to the embodiment of FIG. 5 may include a communication module 510 and an output module 520. In some embodiments, the station 500 may further include a sensing module 530 and/or a storage module 540.

The communication module 510 may be a component that performs communication with the control system 320. The communication module 510 may use a predetermined wireless communication protocol for wirelessly communicating with the control system 320 directly or via a predetermined intermediary system, for example. In some embodiments, the communication module 510 may perform ad-hoc communication, and a proper wireless communication protocol for this purpose may be employed as a protocol to be used by the communication module 510.

In an embodiment, the communication module 510 may use LoRa (low energy long-range) wireless network which uses low power and provides stable wireless communication, and communicate with the control system 510 or an intermediary system at normal times and support ad-hoc network between stations 500 at times of emergency. Also, the station 500 may be implemented to perform continuous communication by using commercial power at normal times and using an internal power source when the commercial power is cut off due to an emergency situation.

The output module 520 may be a component for outputting visual information and/or audio information, as described above. The output module 520 may output predetermined guidance information determined based on a control signal received from the control system 320, by using audio, a direction indicator, a display, and/or lighting.

The sensing module 530 may be provided in the station 500 in case the station 500 even serves to sense an emergency situation. The sensing module 530 may be implemented by including various sensors depending on the type of an emergency situation to be sensed. For example, the sensing module 530 may be implemented by including at least one of various sensors including a flame sensor, a smoke sensor, a fine dust sensor, a temperature sensor, and/or a humidity sensor.

The storage module 540 may be a component that the station 500 stores information needed to implement the technical idea of the present disclosure. For example, the storage module 540 may store different types of guidance information. Other programs or the like for running the station 500 may be stored in the storage module 540. Also, sensing data to be sensed by the sensing module 530 may be stored in the storage module 540.

The control system 320 may create an evacuation route depending on the location of the emergency situation. To create such an evacuation route, the control system 320 may define a graph depending on the plurality of stations 310 and the locations of the plurality of stations 310, thereby enabling efficient creation of an evacuation route.

For example, if an emergency situation occurs in a specific space, an evacuation route for this emergency situation may be generated through a graph that is defined by the locations of the plurality of stations 310 and paths on a space between the locations where the plurality of stations 310 are installed. Accordingly, it is needless to say that the plurality of stations 310 need to be properly installed along a route through which objects can escape from the target region and/or at locations where objects can be concentrated.

In this case, each of the plurality of stations 310 may be defined as a node on a graph. Also, nodes representing stations at two locations between which there is a direct travel path, among the locations where the plurality of stations 310 are installed, may be connected by an edge. Here, the edge may correspond to a unit path described previously with reference to FIG. 4. In this case, the creation of a spatial evacuation route may be defined as an issue involving the creation of an evacuation route on a graph defined by a plurality of stations 310 installed in a space and the locations where the plurality of stations 310 are installed, thereby enabling efficient creation of an evacuation route.

Meanwhile, in order to efficiently evacuate objects located in a target region in case of an actual emergency situation, a characteristic of the target region need to be taken into account. Here, the characteristic of the target region may include a characteristic of a travel path (e.g., a travel path in a road network) through which objects can travel. For example, the characteristic of the travel path may take into account that the number of transportation means that can travel at a time differs depending on, like, whether they are on a two-lane road or on an eight-lane road. Accordingly, such a characteristic of the target region needs to be taken into account when creating an evacuation route, so that as many objects as possible can be evacuated within a short time. To this end, an edge included in a graph may be defined to have a capacity property. Using such a capacity property, an evacuation route may be created by taking into consideration the number of people that can be accommodated during a unit of time on an actual travel path in the target region.

Moreover, in case of an emergency situation, it may be desirable that an evacuation route be created differently depending on how many objects there are to evacuate and where they are located. To this end, objects present at the location of each of nodes, i.e., a plurality of stations 310, may be predicted or measured to define the number of objects at the location of each of the nodes, and therefore they may be evacuated efficiently. Incidentally, there may be occasions when it is difficult to identify the correct number of objects corresponding to each node. For example, there may be technological limitations in actually identifying in real time the correct number of objects for every node in a specific unit of time. In this instance, the density of each node may be predicted through past data, thereby enabling efficient creation of an evacuation route.

In addition, it is possible that not only a single path but also a plurality of paths may exist on an evacuation route available for a location where objects are present. In this case, unless the generation of and guidance through an evacuation route are efficiently done with the passage of time in actual situations, it may cause a bottleneck of objects on a specific evacuation route, which inevitably lengthens the total time needed to evacuate the entire objects. For example, the lengthened total time may involve increasing the risk of damage, which is why it is important to create an evacuation route that makes the total time needed for evacuation as short as possible. To this end, it may be necessary to reflect the passage of time and adaptively create the currently most efficient evacuation route over time and guide objects through it. That is, if an emergency situation occurs at a particular location, it may be necessary to evacuate objects present at a certain location and guide them through a first evacuation route during a specific period of time and then through another evacuation route during a subsequent specific period of time, rather than evacuating them altogether through a specific evacuation route alone. To this end, a technical idea of adaptively creating an evacuation route over time may be provided. This may be achieved by redefining a graph defined according to the locations of the plurality of stations 310 as a time-reflecting graph capable of reflecting the passage of unit time, as will be described later.

Moreover, the location of the emergency situation may be changed over time. For example, in case of a forest fire, the current location of the emergency situation may be changed as the fire spreads over time. For another example, in case of an earthquake, a possible travel path for evacuation may turn into a travel path that is not available for evacuation as a building or a road collapses over time or a fire resulting from the earthquake occurs and spreads. Hereupon, the control system 320 may predict until when an evacuation route for the target region will remain safe by predicting how the disaster will spread, and use the prediction result in creating an evacuation route. For example, it may be determined that a first path of an evacuation route created in a first unit of time is not safe anymore in a second unit of time which is the next unit of time. In this case, the control system 320 may create an evacuation route again for the second unit of time, but without the first path.

Figure 6:
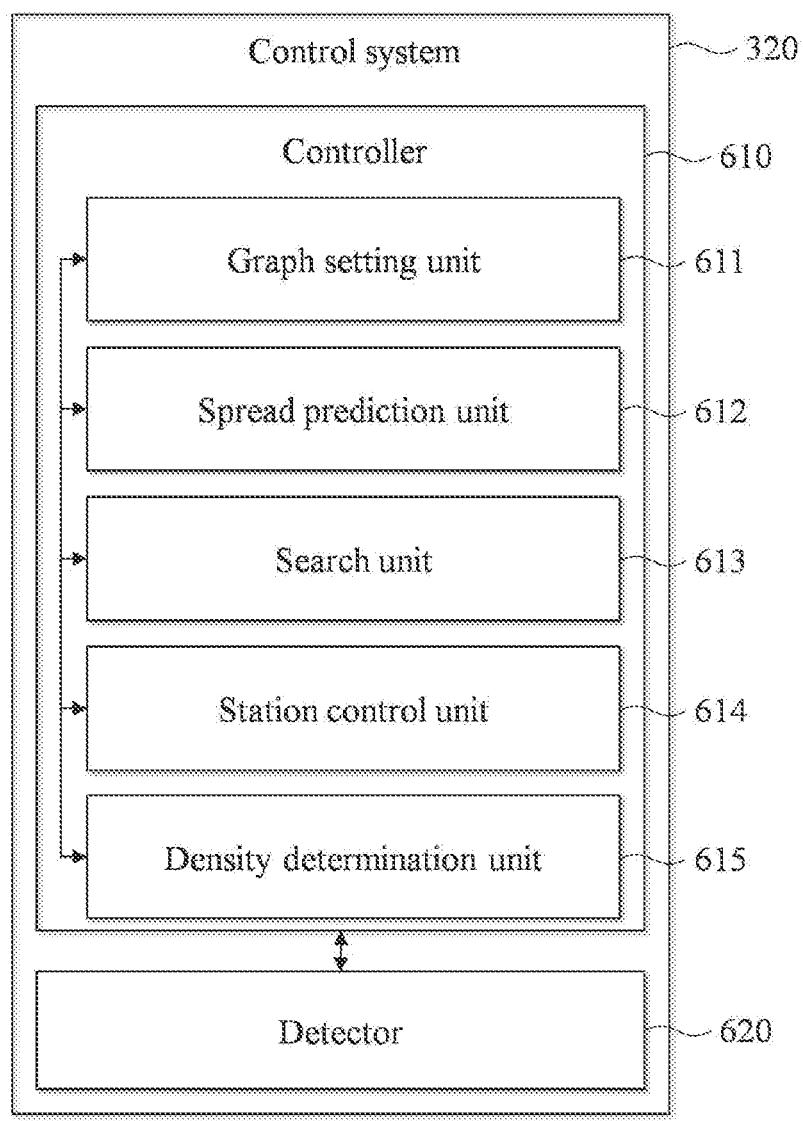
FIG. 6 is a block diagram illustrating an example of an internal configuration of a control system according to an embodiment of the present disclosure.

FIG. 6 is a block diagram illustrating an example of an internal configuration of a control system according to an embodiment of the present disclosure. The control system 320 according to the present embodiment may include a controller 610 and a detector 620. The controller 610 may include a graph setting unit 611, a spread prediction unit 612, a search unit 613, a station control unit 614, and a density determination unit 615.

In the present specification, the term "module" or "unit" may mean a functional and structural combination of hardware for performing the technical idea of the present invention and software for driving the hardware. For example, each of the components may mean a predetermined code and a logical unit of a hardware resource for executing the predetermined code. A person of ordinary skills in the art can easily infer that each of the components does not necessarily mean a physically connected code or a single type of hardware or a specific number of hardware components. Thus, each of the components refers to a combination of hardware and software that performs functions defined in the present specification, and does not imply any particular physical configuration.

The controller 610 may control overall functions and/or resources of the components included in the control system 320 according to the technical idea of the present disclosure. In addition, the controller 610 may create an evacuation route according to the technical idea of the present disclosure and control each of a plurality of stations 310 to evacuate the objects present in the target region along the created evacuation route.

Figure 7:
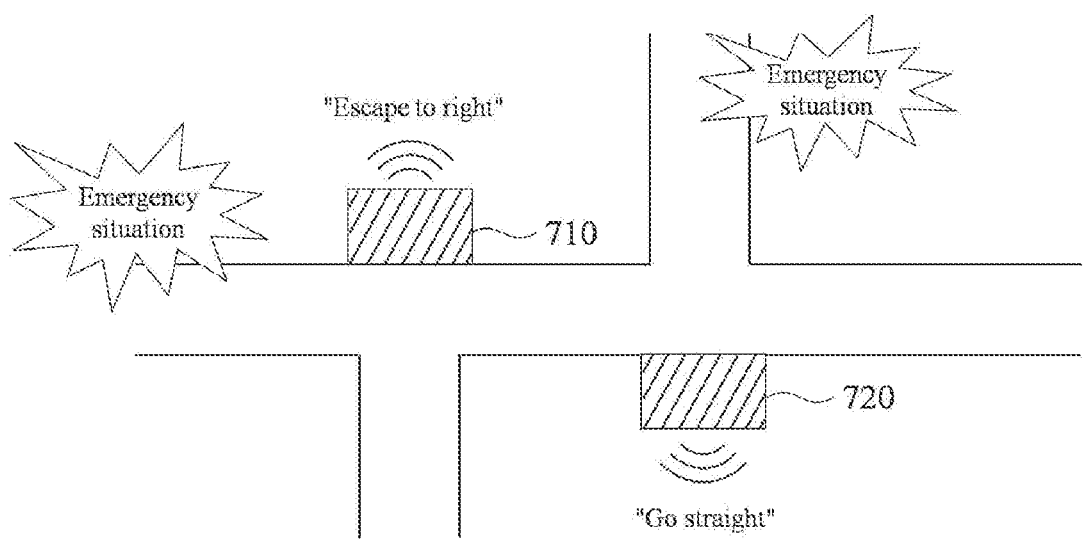
FIG. 7 is a view illustrating an example of an evacuation inducing process according to an embodiment of the present disclosure.

FIG. 7 is a view illustrating an example of an evacuation inducing process according to an embodiment of the present disclosure. Referring to FIG. 7, each of the plurality of stations 310 does not provide indiscriminate and uniform guidance information to objects (e.g., evacuees or escaping vehicles) present at different locations in a target region (e.g., a particular city), but may provide discrete guidance information to the objects depending on the location of each of the plurality of stations 310.

For example, the location where a first station 710 is installed may be a T-shaped forked road on a road network, as shown in FIG. 7. In this case, the guidance information outputted by the first station 710 may be information corresponding to "move to the right" or "move to the left." Needless to say, the guidance information may include visual information and/or audio information for inducing evacuation, such as for guiding to a direction of travel, as described above.

The guidance information may mean information that can guide people to all possible actions they can take, based on a characteristic or structure of the location where the first station 710 is installed. A plurality of pieces of guidance information outputted by the first station 710 may be pre-stored in a storage module provided in the first station 710. And, one of the plurality of pieces of guidance information may be selectively outputted based on a control signal received from the control system 320. Needless to say, in some embodiments, the guidance information may be transmitted from the control system 320 in real time.

Needless to say, the guidance information may vary depending on the location where each of the plurality of stations 310 is installed, and therefore each of the plurality of stations 310 may store different guidance information.

It is needless to say that the guidance information to be outputted by each of the plurality of stations 310 may be determined by an evacuation route found by the control system 320, and that the control system 320 may search for a station corresponding to the found evacuation route and send a control signal to a found station to correspond to the found evacuation route.

For example, on a T-shaped forked road where the first station 710 is installed, as shown in FIG. 7, if an evacuation route found by the control system 320 is a path that requires moving to the right, the first station 710 may output guidance information corresponding to "Escape to the right" so as to induce objects to evacuate along the evacuation route.

Needless to say, the second station 720 also may output guidance information that induces objects to travel in a specific direction along the evacuation route found by the control system 320.

Referring back to FIG. 6, the detector 620 may detect the occurrence of an emergency situation and the location of the emergency situation. To this end, the detector 620 may perform communication with a station that has sensed the emergency situation, among the plurality of stations 310. Needless to say, if there is a sensor network 330 for sensing an emergency situation, apart from the plurality of stations 310, the occurrence of an emergency situation and the location of the emergency situation may be detected through communication with the sensor network 330.

Once the detector 620 detects emergency situation information, including the occurrence of the emergency situation and the location of the emergency situation, the controller 610 may create an evacuation route based on the emergency situation information. The evacuation route may be created based on a graph defined to correspond to the locations where the plurality of stations 310 are installed. Moreover, the controller 610 may create an evacuation route by taking into consideration a prediction result which predicts until when an evacuation route for a target region will remain safe through prediction of a spread of an emergency situation such as a disaster. In addition, the controller 610 may create an evacuation route by taking into consideration the density of objects corresponding to each node. Furthermore, the controller 610 may create an evacuation route that reflects the capacity of each edge included in the graph, based on a characteristic of the target region. Also, the controller 610 may create an adaptive evacuation route that reflects the passage of time, based on the location of objects and the capacity of each edge which change over time. This may mean that objects present at a specific location may be guided along a first evacuation route for a given period of time by the plurality of stations 310 and then guided along a second evacuation route different from the first evacuation route for a subsequent given period of time by the plurality of stations 310.

Consequently, these conditions (parameters) to be taken into account may be used to create an efficient evacuation route based on information on safe routes, which takes into account an actual characteristic of the target region and a spread of an emergency situation such as a disaster, and/or the locations and numbers of objects under the emergency situation, and may adaptively change an evacuation route with the passage of time. Accordingly, it is possible to create an evacuation route that allows for evacuation of objects present in a space as promptly as possible, thereby enabling the provision of an efficient evacuation inducing system 300.

Needless to say, although not specifically shown, the control system 320 may further include various components for implementing the technical idea of the present disclosure. For example, a person of ordinary skill in the art can easily infer that a communication unit (not shown) for performing communication with the plurality of stations 310 and a database or the like that stores data for implementing the technical idea of the present disclosure may be further provided.

As described above, the controller 610 may include a graph setting unit 611. The graph setting unit 611 may set a graph based on spatial information of the target region (e.g., information on a unit path included in the target region) and the locations where the plurality of stations 310 are installed. As is widely known, the graph may include a node and an edge. The graph may be referred to as a network depending on the field in some embodiments, and the edge may be referred to as an arc.

According to the technical idea of the present disclosure, the graph setting unit 611 may configure each of the plurality of stations 310 as a node, and if there is a direct travel path between nodes on an actual disaster area, it may configure an edge connecting the nodes. Moreover, the graph setting unit 611 may further include certain locations where none of the plurality of stations 310 are installed as nodes on the graph. Such nodes are target nodes, for example, which correspond to target locations from which objects are to be evacuated. Stations according to the technical idea of the present disclosure may not be installed at such target locations. Even if that is the case, target nodes may still be present. Thus, it is needless to say that, in cases where no station is installed at a given escape location (e.g., a target location from which objects are to be evacuated), the graph setting unit 611 may configure and add a node to the escape location. Of course, the escape location may be determined in advance in a predetermined manner.

Once the graph is given by the graph setting unit 611, the given graph may mean a data structure that structurally and logically shows the space, and an efficient evacuation route may be created according to the technical ideal of the present disclosure by using such a data structure.

Since the graph is given based on the locations of the plurality of stations 310, it may be important to install the plurality of stations 310 at appropriate locations so as to properly represent the topology, structure, and/or evacuation routes of the disaster area.

The spatial information of the disaster area may refer to information representing a road network, that is sufficient to implement the technical idea of the present disclosure, such as the structure of a road network of a city controlled and regulated by the control system 320, routes in the road network, and premises in the road network. The spatial information may be any information that represents or defines a road network, that is sufficient to determine appropriate behavior to do from the locations of the plurality of stations 310 depending on the location of the emergency situation. The spatial information may be stored in a given database (not shown) included in the control system 320.

Moreover, the spatial information may include information needed to determine the capacity of each travel path. The capacity may be an indicator of the number of people, i.e., objects that can be accommodated in a corresponding travel path and/or the number of transportation means such as vehicles. The capacity may be set according to the width (breadth), length, and/or slope of the travel path. The graph setting unit 611 may identify information on a travel path corresponding to each configured edge through the spatial information, and may automatically set the capacity of each edge included in the graph according to a predetermined criterion based on the identified result. Needless to say, in some embodiments, it may be possible to identify the number of objects that can be accommodated in each travel path, such as people or transportation means, and determine the capacity of each edge based on the identified result.

Additionally, the graph setting unit 611 may set the cost of each edge based on the spatial information. The cost may be an indicator of the time taken for a given object to travel a corresponding edge. The graph setting unit 611 may automatically set the cost of an edge based on spatial information corresponding to the edge. For example, the cost of an edge may be set by using the length and/or slope of a travel path corresponding to the edge. The cost may be used to calculate the sum of the costs of edges present on a path through which a given object will escape from the current location to a target location, and the sum of the costs may be an indicator of the time taken to escape through that path. Thus, a shortest path algorithm for a graph with the costs of edges may be used.

The above example will be described with reference to FIGS. 8 to 10.

Figure 8:
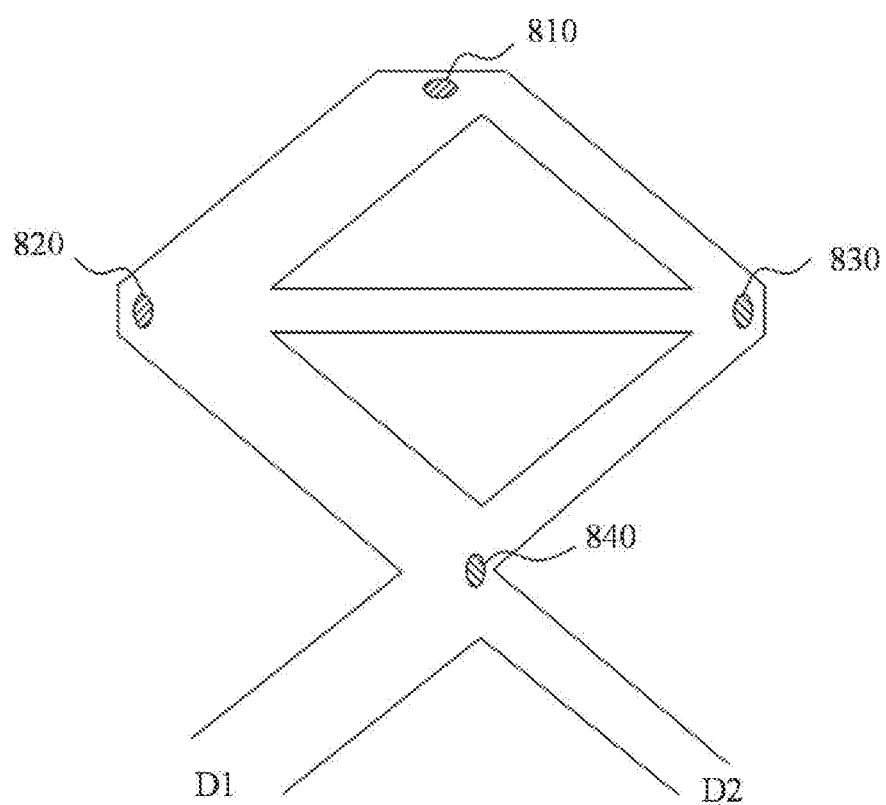
FIG. 8 is a view illustrating a simple example of a road network according to an embodiment of the present disclosure.

FIG. 8 is a view illustrating a simple example of a road network according to an embodiment of the present disclosure. FIG. 9 is a view for explaining the concept of defining a travel path between stations by a graph, for an evacuation inducing method according to an embodiment of the present disclosure. FIG. 10 is a view for explaining an example of how the capacities and costs of edges are shown on a graph according to an embodiment of the present disclosure.

First, referring to FIG. 8, a sub-region may be present in a target region, as shown in FIG. 8. In the sub-region, a plurality of stations 810, 820, 830, and 840 may be installed at predetermined locations. Also, travel paths may be present between the locations where the plurality of stations 810, 820, 830, and 840 are installed, as shown in FIG. 8. Also, two destinations (e.g., D1 and D2) may be present on one side of the sub-region, as shown in FIG. 8.

Figure 9:
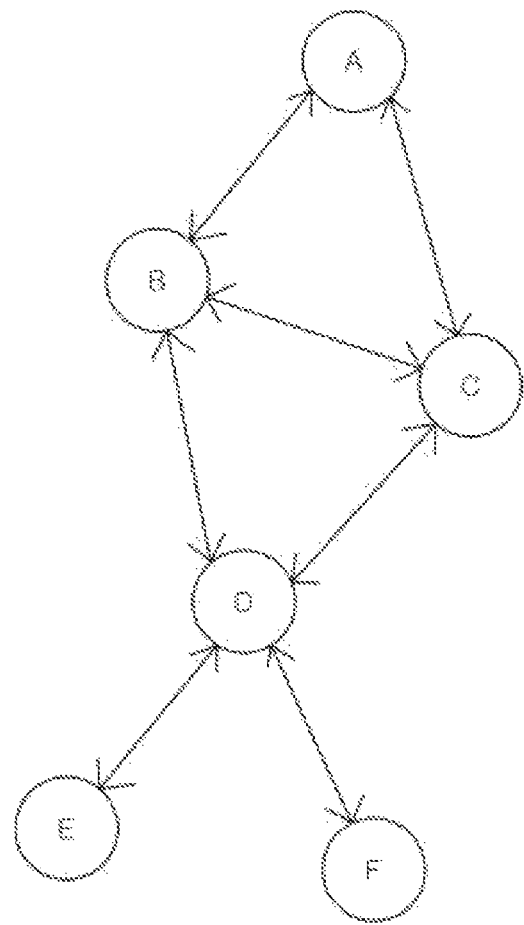
FIG. 9 is a view for explaining the concept of defining a travel path between stations by a graph, for an evacuation inducing method according to an embodiment of the present disclosure.

In this case, the graph setting unit 611 may set such a graph as shown in FIG. 9. Referring to FIGS. 8 and 9, the first station 810 may correspond to a first node A. The second station 820 may correspond to a second node B. The third station 830 may correspond to a third node C. The fourth station 840 may correspond to a fourth node D. Also, the graph setting unit 611 may add destination nodes (e.g., E and F) corresponding to the two destinations (e.g., D1 and D2) to the graph. That is, even if there is no station at a destination, the graph setting unit 611 may insert a destination node corresponding to the destination into the graph.

Moreover, the edges included in the graph may be configured to correspond to travel paths between the locations of the plurality of stations (e.g., 810, 820, 830, and 840) shown in FIG. 8. For example, the travel path between the first station 810 and the second station 820 may be represented by an edge connecting the first node A and the second node B, in the graph shown in FIG. 9. In this manner, a graph (e.g., the graph shown in FIG. 9) corresponding to an actual space (e.g., the sub-region shown in FIG. 8) may be given by the graph setting unit 611. The graph setting unit 611 may find out whether there is a travel path between locations where stations are installed, by identifying the topological relation between these locations based on spatial information of the target region.

Meanwhile, as described above, the graph setting unit 611 may assign each edge a capacity property and/or a cost property, in order to reflect an actual characteristic of the target region. The capacity and the cost also may be set based on an actual characteristic of the target region. For example, as shown in FIGS. 8 and 9, an actual travel path corresponding to a first edge A-B (the travel path between the first station 810 and the second station 820 in FIG. 8) may be relatively large in width. In this case, the first edge A-B may be configured to have a comparatively high capacity (e.g., 10). Characteristics of a space that determine capacity may include the width of a travel path (or the number of lanes on a road), its length, and/or its slope. The wider and longer the travel path and the gentler its slope, the higher capacity it has. It is needless to say that any characteristic that represents the number of people to be accommodated by the corresponding edge may be used to determine the capacity.

Moreover, an actual travel path corresponding to a second edge A-C (the travel path between the first station 810 and the third station 830 in FIG. 8) may be relatively small in width. In this case, the second edge A-C may be configured to have a comparatively low capacity (e.g., 5).

In this manner, the graph setting unit 611 may set the capacity of each edge.

In addition, the graph setting unit 611 may set a cost as a property of each edge. The setting of a cost also may be determined based on spatial information of the target region. The cost may be an indicator that is set to be proportional to the time taken to travel along an edge. Thus, the cost may be set based on the length and/or slope of each path. For example, the graph setting unit 611 may set the first edge A-B to have a cost of 3 and set the second edge A-C to have a cost of 2, as shown in FIG. 10. When taking slope into consideration, different costs may be set for the same edge depending on the direction of the edge, like a comparatively low cost for an upward slope and a comparatively high cost for a downward slope.

In this manner, the graph setting unit 611 may assign each edge a capacity and a cost as properties. For example, the capacity and cost of the first edge A-B may be (10, 3), and the capacity and cost of the second edge A-C may be (5, 2).

Figure 10:
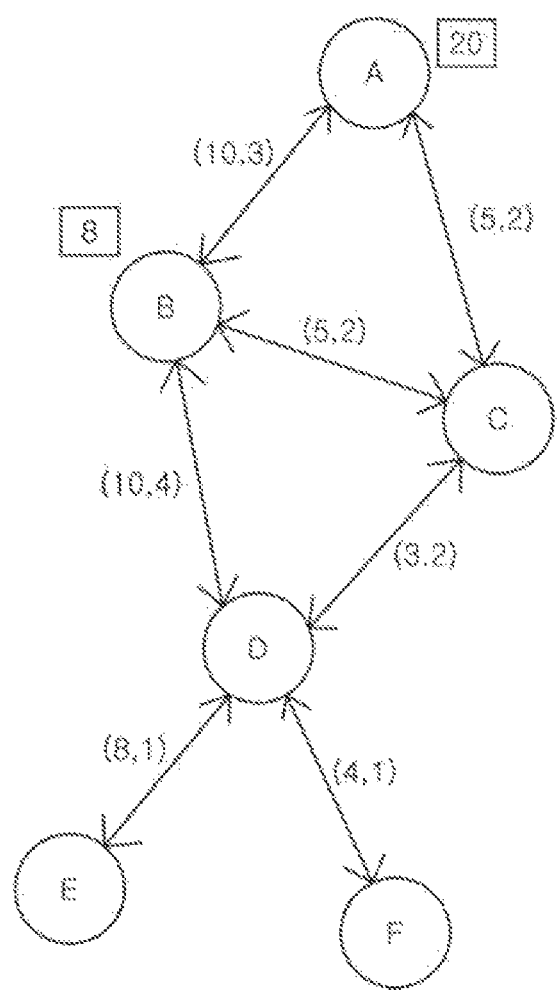
FIG. 10 is a view for explaining an example of how the capacities and costs of edges are shown on a graph according to an embodiment of the present disclosure.

As such, the graph setting unit 611 may assign each edge in the graph a capacity property and a cost property, as shown in FIG. 10.

Furthermore, the graph setting unit 611 may determine the density of each node measured or predicted by the density determination unit 615. As will be described later, the density determination unit 615 may measure or predict the number of objects at a location corresponding to each node. For example, as shown in FIG. 10, the density determination unit 615 may determine the density of the first node A to be 20 and the density of the second node B to be 8. The other nodes may all have a density of 0. In this case, the graph setting unit 611 may assign each node a density as a property. Nodes with a density greater than 0 may be classified as source nodes.

As such, once a graph reflecting a characteristic of the target region is given by the graph setting unit 611, as shown in FIG. 10, the problem of evacuating objects from the target region may be solved by using a path search using a graph and/or a maximum flow algorithm. By thusly configuring a graph, the problem may be solved by a combination of a variety of well-known algorithms.

For example, all paths from source nodes to a destination node may be created by using a shortest path algorithm or an all path algorithm, and these paths may be sequentially inserted into the evacuation route in descending order of capacity (that is, the capacity of a path is equal to the minimum of the capacities of the edges along the path). Once a specific path is selected and inserted into the evacuation route, the other travel paths for objects may be repeatedly searched for by using a new graph that reflects the selected specific path. For example, if the first node A is a source node, and a first path A-B-D-E is firstly selected as an evacuation route, the capacity (e.g., 8) of this path may be reflected in each edge of the first path. Then, the edge E-D may have a capacity of 0, the edge A-B may have a capacity of 2, and the edge B-D may have a capacity of 2. Moreover, since the first node A has a density of 20 and eight objects may travel along this path, an evacuation route along which the remaining twelve objects can be evacuated may be searched for in a new graph that reflects the first path. In this manner, it is possible to sequentially find evacuation routes that allow all objects to escape.

According to another embodiment, paths that allow for generating a large flow (i.e., the number of objects that can be evacuated) may be sequentially specified through a maximum flow algorithm, and then a combination of paths that minimizes the costs of the paths may be specified as an evacuation route.

Besides, other factors may vary depending on the policy or purpose of evacuation, including whether to minimize cost, whether to repeatedly generate a maximum flow for the remaining objects after selecting a path that allows for instantaneously generating a maximum flow (i.e., a path along which a large number of people can be instantaneously evacuated), or whether to minimize the total time (i.e., total cost) taken for all objects present in a space to escape, and, accordingly, evacuation routes may be found in various ways.

Meanwhile, as will be described later, the graph setting unit 611 may set a time-reflecting graph based on a graph. The time-reflecting graph may refer to a graph for searching for an evacuation route by reflecting the passage of time on a per-unit time basis according to the technical ideal of the present disclosure. Such a time-reflecting graph may be generated by configuring an edge between nodes in a given unit time and nodes after the unit time. When searching for an evacuation route using a time-reflecting graph, an evacuation route that reflects the passage of time may be found. This will be described later.

Moreover, the graph setting unit 611 may determine the number of objects present at a location corresponding to each node in case of an emergency situation, based on a determination result from the density determination unit 615. For example, the density determination unit 615 may perform a function of determining the number of objects to be evacuated for each node.

The density determination unit 615 may actually measure the density, i.e., the number of objects, by acquiring an image of a location corresponding to each node, for example. However, there may be no image acquisition means for each node to acquire an image, or even if there is one, it may not be easy to find the number of objects within a short time through an image.

Accordingly, in some implementations, the density determination unit 615 may predict the number of objects currently present at a location corresponding to each node, i.e., the density of each node, through past data. Such a prediction may have a different value depending on the time.

For example, time slots may be allotted according to the time of day or according to a predetermined criterion, such as morning, afternoon, evening, seasons, etc., and the density of a specific node may be differently predicted depending on the time slot. For density prediction, past data may be needed for use in determining the number of objects corresponding to the location of each node. Examples of such data may be data used to statistically determine in what percentage of objects are located in which nodes or actually measured data. Needless to say, such data may have a different value depending on the season or the time slot. In some implementations, such data may be data that shows not the percentage of objects at each node but how many objects roughly are present at each node during a given period of time in the past. In any case, such past data may be any data that is accumulated enough to predict the current density of each node.

Consequently, the density determination unit 615 may predict the current density of each node by using data for determining past densities at a point in time when an emergency situation occurs. Needless to say, in order to determine density, the density determination unit 615 may determine the density of each node by further using currently known data (e.g., the population of the city, the number of vehicles in the city, or the number of vehicles expected to enter a specific node). Once the density of each node is thusly determined, the graph setting unit 611 may assign the density of each node as a property of each node. Then, searching for an evacuation route according to the technical idea of the present disclosure may be re-defined as a problem of moving objects corresponding to the density of nodes included in a graph (or time-reflecting graph) to a specific node (e.g., a destination node). In this case, for example, as is known, a max flow algorithm for moving as many flows as possible in the same period of time (or in the possible shortest time) may be used to search for an evacuation route.

Meanwhile, the controller 610 may determine a location where each of the plurality of stations 310 should be installed, by using spatial information. For example, the controller 610 may extract paths that can be used as evacuation routes in a space by using spatial information, and extract locations on the extracted paths to which guidance is needed as locations where each of the plurality of stations 310 should be installed. The locations to which guidance is needed may be, but not limited to, locations from which travel is allowed in multiple directions, such as a forked road, for example.

The search unit 613 included in the controller 610 may search for an evacuation route by using the above-described graph or time-reflecting graph. Needless to say, the search unit 613 may configure a predetermined edge on the graph as a disable edge that is not available for travel (e.g., a process of setting the capacity of the corresponding edge to 0 or temporarily deleting the edge) and then searching for an evacuation route. Needless to say, to configure the disable edge, the search unit 613 is able to adaptively select the disable edge by referring to spatial information of the target region. For ex ample, if an emergency situation occurs on a specific forked road, it is desirable that every edge corresponding to the forked road is disabled, and if an emergency situation occurs on a specific unforked road, only an edge corresponding to this unforked road may be disabled. Also, the search unit 613 may adaptively select the disable edge depending on the type of the emergency situation. For example, in case of a fire, only an edge where the fire has occurred may be selected as the disable edge, and in case of a gas leak, every edge in the vicinity present within a predetermined range may be selected as the disable edge. As a result, the search unit 613 may adaptively select the disable edge based on the location of the emergency situation, the type of the emergency situation, and/or the spatial information.

Moreover, the disable edge may be configured by taking into further consideration prediction data from the spread prediction unit 612. For example, the spread prediction unit 612 may predict the speed with which and where the emergency situation will spread from the location of the emergency situation, and therefore predict until when each edge will remain safe. Take forest fire for example. A forest fire spread model and the speed of spread of fire may be predicted through topography, weather, fuel factor, image information, etc. In some embodiments, it is possible to predict the direction of the forest fire and secure a safe zone, by analyzing property information of the forest fire disaster, such as temperature changes, smoke, wind direction, etc. As such, the spread prediction unit 612 may predict until when each edge will remain safe, by taking into consideration the speed and region of spread for each type of emergency situation. In this case, the search unit 613 may dynamically determine a disable edge at each point in time, when adaptively selecting an evacuation route with the passage of time by using a time-reflecting graph to be described later. Afterwards, the search unit 613 may exclude a dynamically selected disable edge from a time-reflecting graph and adaptively select a safe evacuation route with the passage of time through the time-reflecting graph from which the disable edge is excluded. An algorithm for predicting spread for each disaster type may be at least one of already well-known algorithms.

An evacuation route to be found according to the technical idea of the present disclosure may be a travel path that reflects the capacity of each travel path. Moreover, when using a time-reflecting graph, an evacuation route may be adaptively selected with the passage of time. For example, it is needless to say that the evacuation route may include a plurality of paths in the same unit time, and an evacuation route for an object present at a specific location in a specific time slot is a first evacuation route, and the first evacuation route may turn into a second evacuation route with the passage of time. Such a process of searching for an evacuation route may be implemented by configuring a graph based on the plurality of stations 310 and the spatial information of the target region according to the technical idea of the present disclosure. Also, other properties may be assigned to the graph depending on the properties of the space whose spatial information is used. Thus, searching for a route along which objects present in a space are evacuated in case of an emergency situation may be re-defined as a problem of searching for a route in a graph set based on the locations and of the plurality of stations 310 and the spatial information. In addition, the properties (e.g., edge capacity, edge cost, etc.) of the graph may be determined based on the locations of the plurality of stations 310 and the spatial information, and the density determination unit 615 may assign properties (e.g., density, etc.) to nodes included in the graph, thereby enabling a realistic and efficient search for an evacuation route that fits an actual evacuation situation in the target region. Particularly, as described above, it is possible to adaptively search for an efficient evacuation route with the passage of time, by using a time-reflecting graph defined by the present disclosure.

According to the technical idea of the present disclosure, once a graph or time-reflecting graph having the aforementioned characteristics is given based on the spatial information of the target region and the locations of the plurality of stations 310, a variety of conventional algorithms may be used for path search, including a shortest path search algorithm and/or a maximum flow algorithm.

However, path search may be implemented through an algorithm according to the technical idea of the present disclosure, as will be described later. The technical idea of the present disclosure involves a technical idea for adaptively selecting an evacuation route with the passage of time.

An example of this will be described with reference to FIGS. 11 and 12.

Figure 11:
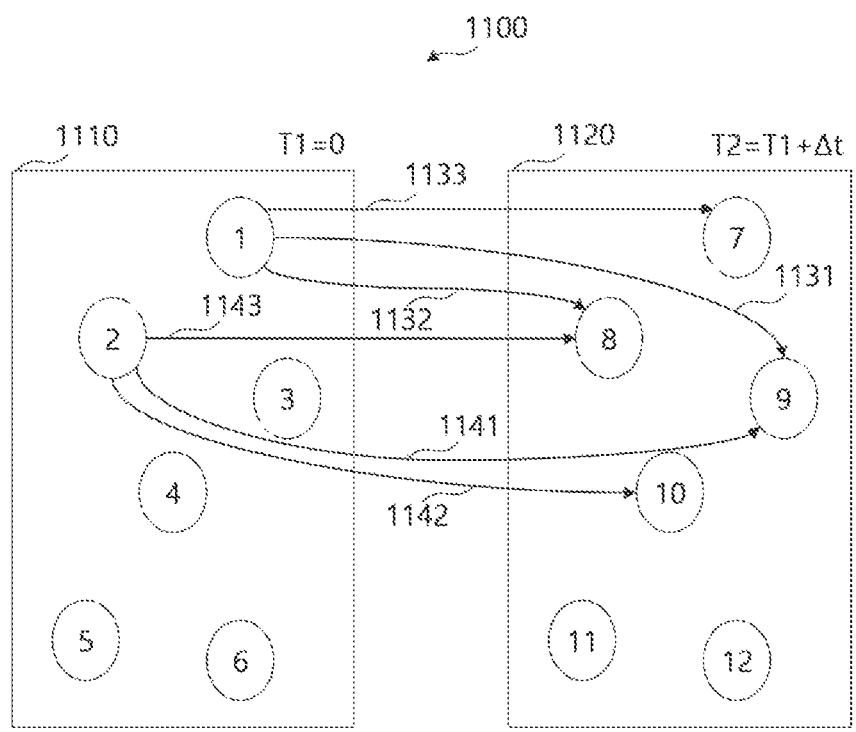
FIGS. 11 and 12 are views illustrating an example in which an evacuation inducing system according to an embodiment of the present disclosure generates a graph that reflects the passage of time to find an efficient evacuation route.
Figure 12:
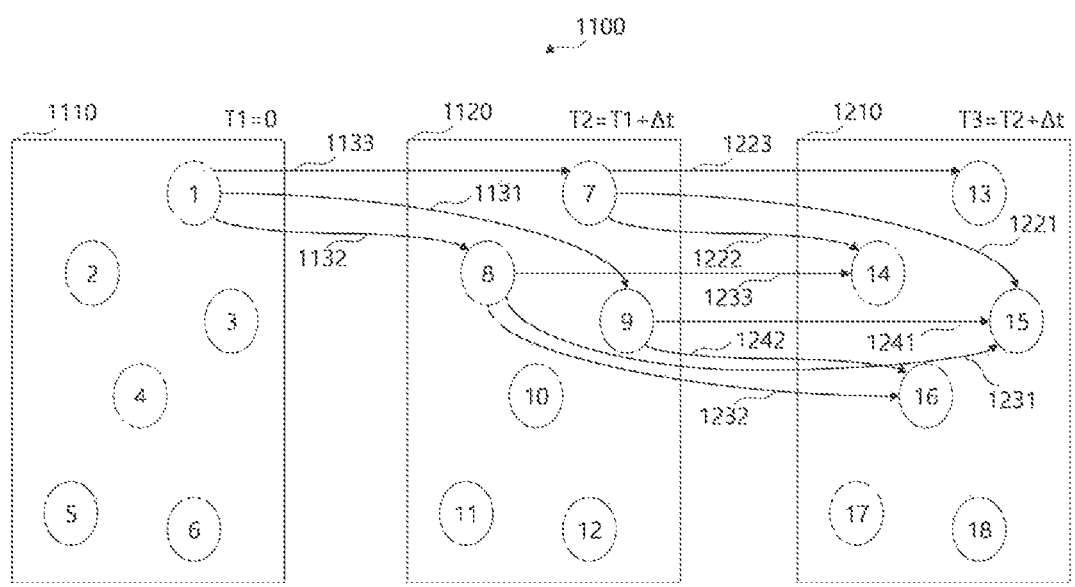

FIGS. 11 and 12 are views illustrating an example in which an evacuation inducing system according to an embodiment of the present disclosure generates a graph that reflects the passage of time to find an efficient evacuation route.

First, referring to FIG. 11, a time-reflecting graph 1100 according to the technical idea of the present disclosure may include a plurality of unit time graphs 1110 and 1120, as illustrated in FIG. 11.

The graph setting unit 611 may generate the unit time graphs 1110 and 1120 based on a graph (e.g., FIG. 9 or FIG. 10) that is given based on the locations of the plurality of stations 810, 820, 830, and 840 as described above.

For example, let T2 be a current unit time. Then, the graph setting unit 611 may sequentially generate a unit time graph 1110 corresponding to T1 and a current unit time graph 1120.

Each unit time graph may include nodes included in the graph (e.g., FIG. 9 or FIG. 10).

Moreover, the time-reflecting graph 1100 may include intergraph edges 1131, 1132, 1133, 1141, 1142, and 1143 between nodes included in a previous unit time graph (e.g., 1110) and a current unit time graph 1120. For example, in the unit time graphs 1110 and 1120 included in the time-reflecting graph 1100, edges may be configured, not between nodes included in a unit time graph, but between nodes included in the previous unit time graph and the current unit time graph. This, in turn, may mean that a travel path may be configured in consideration of the time needed for objects to travel.

Therefore, the time-reflecting graph 1100 may refer to a graph that shows whether objects can travel on a per-unit time basis, from the previous unit time to the current unit time.

For example, the first unit time graph 1110 and the second unit time graph 1120 may include nodes corresponding to each other. That is, Node 1 included in the first unit time graph 1110 and Node 7 included in the second unit time graph 1120 may refer to corresponding nodes at the same location in terms of space. It should be noted that Node 1 may refer to the location of a corresponding node in a first unit of time (e.g., the location of node A of FIG. 10), and Node 7 may refer to the location of a corresponding node in a second unit of time (e.g., the location of node A of FIG. 10).

Therefore, the nodes (Node 1, Node 2, Node 3, Node 4, Node 5, and Node 6) included in the first unit time graph 1110 may be nodes corresponding to the nodes (Node A, Node B, Node C, Node D, Node E, and Node F) in the graph (e.g., FIG. 10). Likewise, the nodes (Node 7, Node 8, Node 9, Node 10, Node 11, and Node 12) included in the second unit time graph 1120 may be nodes corresponding to the nodes (Node 1, Node 2, Node 3, Node 4, Node 5, and Node 6) in the first unit time graph 1110.

Then, the intergraph edges included in the time-reflecting graph 1110 may be edges between the nodes included in the first unit time graph 1110 and the nodes included in the second unit time graph 1120.

The intergraph edges may include a hold edge (e.g., 1133) between a first node (e.g., Node 1) included in the previous unit time graph (e.g., 1110) and a second node (e.g., Node 7) corresponding to the first node and included in the current unit time graph (e.g., 1120). As such, corresponding nodes included in different unit time graphs may be connected by an edge. Such a hold edge may be an edge that connects nodes corresponding to the same location, which may mean that an object present at that location may remain at the same location in the next unit of time. Accordingly, a hold edge may mean an edge along which there is no object moving with the passage of time.

Furthermore, the intergraph edges may include a path edge (e.g., 1131 and 1132) between at least one fourth node (e.g., Node 8 and Node 9) included in the second unit time graph 1120 and the first node (e.g., Node 1), with the at least one fourth node corresponding to at least one third node (e.g., Node B and Node C) between which and a node corresponding to the first node (e.g., Node 1) there exits an edge on the graph (e.g., FIG. 10). In this case, the path edge may be an edge of a path along which objects can actually travel with the passage of time.

Similarly, intergraph edges may be configured between every node included in the first unit time graph 1110 and the nodes included in the second unit time graph 1120. For example, an edge 1143 between Node 2 and Node 8 may be a hold edge, and an edge 1141 between Node 2 and Node 9 and an edge 1141 between Node 2 and Node 10 may be a path edge. Although FIG. 11 shows intergraph edges for Node 1 and Node 2 alone, intergraph edges may be configured for other nodes as well in the same manner.

The properties (e.g., capacity and cost) described with reference to FIG. 10 may be set for each intergraph edge. For example, path edges (e.g., 1131 and 1132) may have the properties (e.g., (5,2), (10,3) of the edges (e.g., the edge between A and C and the edge between A and B) corresponding to the path edges (e.g., 1131 and 1132) and included in the graph (e.g., FIG. 10). In addition, the capacity of a hold edge may be set to be the capacity of the corresponding node (e.g., the capacity available at the location of the corresponding node), and the cost may be set to be an indicator corresponding to a unit of time.

Consequently, according to the technical idea of the present disclosure, the graph shown in FIG. 10 may be re-defined as a time-reflecting graph 300 as illustrated in FIG. 10. If the edge 1133 between Node 1 and Node 7 is selected for a path to be included in the evacuation route, it may mean that the objects corresponding to Node 1 (Node A) do not travel with the lapse of time from T1 to T2). On the other hand, if the edge 1132 between Node 1 and Node 8 is selected for a path to be included in the evacuation route, the objects at Node 1 (Node A) may move to Node 8 with the lapse of time, which, in turn, may mean that the objects located at Node A in the space move to Node B. As a result, the problem of searching for an evacuation route through the graph illustrated in FIG. 10 may be re-defined as a problem of searching for an evacuation route through the time-reflecting graph 1100 illustrated in FIG. 11 according to the technical idea of the present disclosure.

Since the time-reflecting graph 1100 in FIG. 11 shows the lapse of one unit of time and no path is created between a specific source node (e.g., Node A) and a destination node (e.g., Node 11 and Node 12) with the lapse of one unit of time, a new time-reflecting graph may be generated which includes a graph for the next unit time.

An example of this is illustrated in FIG. 12.

The time-reflecting graph 1100 illustrated in FIG. 12 further includes a third unit time graph 1210 which is a graph for time T3.

If the third unit time graph 1210 is included in the time-reflecting graph 1100, the graph setting unit 611 may likewise configure intergraph edges 1221, 1222, 1223, 1231, 1233, 1241, and 1242 between the second unit time graph 1120 and the third unit time graph 1210, as described above.

As described above, the edges 1223, 1233, and 1241 may be hold edges, and the edges 1221, 1222, 1231, 1232, and 1242 may be path edges.

Although FIG. 12 illustrates the time-reflecting graph 1100 which only includes intergraph edges corresponding to a specific source node (Node 1), intergraph edges corresponding to other sources nodes (e.g., Node 2) also may be included in the time-reflecting graph 1100.

Consequently, the graph setting unit 611 may update the time-reflecting graph 1100 while sequentially adding unit time graphs in this manner until a path is created from a specific source node to a destination node.

As such, the final time-reflecting graph 1100 may be a graph that further reflects the passage of time as a property, in addition to the properties of the graph illustrated in FIG. 10, and a time-adaptive evacuation route may be found by searching for an evacuation route through this time-reflecting graph 1100.

For example, although the time-reflecting graph 1100 illustrated in FIG. 12 is a graph in which no path to the destination node is created, a first path and a second path may be selected for an evacuation route, the first path may be a path including Node 1, Node 8, and Node 16, and the second path may be a path including Node 1, Node 7, Node 13, and Node 21 (not shown).

In this case, the plurality of stations 710 corresponding to Node A may give guidance information such that objects move to Node B corresponding to Node 8 in a period of time from T1 to T3 and then move to Node C corresponding to Node 21 (e.g., a node in a fourth unit time graph that corresponds to Node C) from T4 onwards.

As such, when using the time-reflecting graph 1100 according to the technical idea of the present disclosure, the same station may be controlled to adaptively output different guidance information with the passage of time. Needless to say, the adaptive outputting of such guidance information may be determined depending on how to search for an evacuation route using the time-reflecting graph 1100. As described above, an evacuation route may be found by using various search algorithms for the graph (e.g., a shortest path algorithm, an all path algorithm, and/or a maximum flow algorithm). Also, different evacuation routes may be found depending on what the policy of evacuation route search is aimed at (e.g., evacuating some objects as quickly as possible or minimizing the cost for evacuating all objects), as described above.

Moreover, according to the technical idea of the present disclosure, each time a new unit time graph is added to the time-reflecting graph 1100, the search unit 613 may identify whether there is a path from a specific source node to each of the nodes included in a new unit time graph, and the capacity of an identified path. For example, if the third unit time graph 1210 is added to the time-reflecting graph 1100 as shown in FIG. 12, it is possible to determine whether there is a path from a specific source node (e.g., Node 1) to each of the nodes (e.g., Node 13 through Node 18) included in the third unit time graph 1210. If there is a path, it is possible to identify which edges this path is made up of and the capacity of this path. Needless to say, there may be a plurality of paths from a specific source node to a specific node. In FIG. 12, there is a path from the source node (Node 1) to Node 13, and the capacity of this path may be sufficiently large. Also, there is a path from the source node (Node 1) to Node 14, and the capacity of this path may be equal to the minimum of the capacities of the edges (e.g., the capacity of the edge 1222) on the path. In this manner, it is possible to determine whether there is a path from Node 15, Node 16, Node 17, and Node 18 to the source node (Node 1) and the capacity of the path. Whether there is a path from each of these nodes to a specific source node, each node may be assigned properties, including which edges this path is made up of and the capacity of this path, and each node may be defined as a data structure capable of representing these properties.

Since there is no path from Node 17 and Node 18 to the source node (Node 1), a fourth unit time graph may be added to the time-reflecting graph 1100, though not shown in FIG. 12, and it is possible to determine the presence of a path from a specific source node to each of the nodes included in the fourth unit time graph, the edges include in the path, and the capacity of the path.

In this manner, it is possible to find at least one path from a specific source node to a destination node, while identifying each node's properties (the presence of a path, the edges included in the path (i.e., which edges the path is made up of), and the capacity of the path. That is, this may mean that the time need to escape from a specific source node (e.g., Node 1) to a destination node (e.g., Node 17) has passed, and that a path for escaping from a location corresponding to the specific source node to the corresponding exit node has been found. Then, the found path may be included in the evacuation route. Once a certain path is specified to be included in the evacuation route, if the density of the specific source node (e.g., Node 1) is larger than the capacity of the path specified to be included in the evacuation route, search may be performed again by reflecting the path included in the evacuation route (i.e., readjusting the capacity of the path), as described above. Needless to say, if the density of the specific source node (e.g., Node 1) is smaller than the capacity of the path specified to be included in the evacuation route, all objects at the specific source node (e.g., Node 1) may be allocated to the specified path, and the remaining capacity of the specified path may be used when searching for a path from another source node.

Moreover, it is needless to say that, if there are a plurality of paths for a certain exit node in a specific unit time, the capacity of each path may be determined, and at least one exist node may be selected for a path to be included in an evacuation route in descending order of capacity. Alternatively, the cost of each of the plurality of paths (i.e., the total time taken to escape through a certain path) may be determined, and they may be selected as a path to be included in the evacuation route in ascending order of cost.

As a result, it is possible to determine whether there is a destination node to which a path from a specific source node exists, while finding the properties of each node with respect to the specific source node. Also, if a first destination node is found to which there exists a path from the specific source node, this may mean that there exists a first path through which an object located at the specific source node can escape. Thus, the search unit 613 may insert paths in the evacuation route in that order. If there are a plurality of paths from a specific source node to a destination node to which a path is found, the paths may be selected for the evacuation route in descending order of capacity or in ascending order of cost.

When a certain path is selected for the evacuation route, the search unit 613 may update the time-reflecting graph 1100. The update may be a process of deducing the capacity of the selected path from the time-reflecting graph 1100. In this case, when objects escape through the selected path, the capacities of the edges present on this path may be readjusted by the deduction of the capacity of this path. If the density of a specific source node is larger than the capacity of the currently selected evacuation route, in other words, there are remaining objects to be evacuated, other evacuation routes may be searched for by using the readjusted time-reflecting graph 1100. Evacuation routes through which all objects can escape from a specific source node may be sequentially found in this manner, and then evacuation routes from the other source nodes (i.e., nodes where there are objects to be evacuated) may be likewise searched for, along with capacity adjustment.

Once an evacuation route is found using the time-reflecting graph 1100, the station control unit 614 included in the control system 320 may output a control signal for each unit time by using the unit time for each evacuation route and the unit time for each of the edges included in the evacuation route. Needless to say, there may be no change of guidance information with respect to a specific station which is outputted with the passage of time. In this case, a control signal for controlling that station may be outputted only when there is a change of the guidance information to be outputted.

In any case, when searching for an evacuation route by using the time-reflecting graph 1100 according to the technical idea of the present disclosure, an adaptive evacuation route may be found with the passage of time, as described previously, and this may mean that objects present at a specific location may be guided through different evacuation rotes with the passage of time. Accordingly, it is possible to provide efficient evacuation guidance by taking into consideration the capacity of an actual path to escape in a target region, the location of objects to be evacuated, and the passage of time.

The above-described example is merely an explanation of how an evacuation route is searched for by using the time-reflecting graph 1100 according to the technical idea of the present disclosure. A person of ordinary skill in the art may easily infer that, once the time-reflecting graph 1100 is defined, various evacuation routes may be found according to conventional various path search algorithms and/or flow algorithms and the policy of evacuation route search.

As such, according to embodiments of the present disclosure, it is possible to distribute and guide users along a safe route, on the basis of first prediction data, which predicts the degree of congestion on each unit path in a road network with respect to each disaster and the expected travel time, based on the number of objects (for example, the population or the number of registered means of transportation (e.g., vehicles)) in a target region (e.g., a particular city) that is preliminarily identified, and second prediction data, which predicts until when each unit path in the target region will remain safe through prediction of a spread of the disaster.

The above-described system or device may be implemented in the form of a hardware component or a combination of a hardware component and a software component. For example, the system and components described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. A processing device may run an operating system (OS) and one or more software applications executed on the OS. Furthermore, the processing device may access, store, manipulate, process, and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, code, an instruction, or a combination of one or more of these and may configure a processing device so that it operates as desired or may instruct the processing device independently or collectively. The software and/or data may be embodied in a machine, component, physical device, virtual equipment, computer storage medium or device of any type in order to be interpreted by the processing device or to provide an instruction or data to the processing device. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer readable medium may include a program instruction, a data file, a data structure, or a combination thereof. The program instructions recorded on the medium may be specifically designed for the embodiments or may be well known to one of ordinary skill in the art of computer software. Examples of the computer-readable recording medium include magnetic media such as a hard disk, a floppy disk and a magnetic tape, optical media such as CD-ROM and DVD, magneto-optical media such as a floptical disk, and hardware devices such as ROM, RAM, and flash memory, which are specially configured to store and execute program instructions. Examples of the program of instructions may include not only machine language codes produced by a compiler but also high-level language codes that can be executed by a computer using an interpreter, etc.

As described above, although the embodiments have been described in connection with the limited embodiments and the drawings, those skilled in the art may modify and change the embodiments in various ways from the description. For example, the relevant results may be achieved even when the described technologies are performed in a different order than the described methods, and/or even when the described components such as systems, structures, devices, and circuits are coupled or combined in a different form than the described methods or are replaced or substituted by other components or equivalents.

Therefore, other implementations, other embodiments, and equivalents to the claims are also within the scope of the following claims.

The embodiments of the disclosure in which an exclusive property or privilege is claimed are defined as follows:

1. An evacuation inducing method performed by a computer device, the method comprising:
   detecting the location of an emergency situation in a target region including a road network;
   generating prediction data for each unit path included in the target region, which predicts until when each unit path will remain safe, by predicting a spread of the emergency situation from the location of the emergency situation by using a spread prediction algorithm;
   predicting the degree of congestion on each unit path included in the target region and the expected travel time by taking into consideration the number of objects included in the target region that is preliminarily identified;
   creating an evacuation route based on the prediction data, the degree of congestion on each unit path, and the expected travel time; and
   initiating guidance for distributing and evacuating the objects based on the created evacuation route,
   wherein said each unit path corresponds to a travel path between a plurality of stations that are installed at different locations in the target region so that objects located in the target region are evacuated from the target region,
   wherein the degree of congestion of said each unit path is determined based on a capacity corresponding to the number of objects that said each unit path can accommodate per unit time, and the capacity is determined based on the number of lanes of a road included in the road network corresponding to said each unit path,
   wherein the spread prediction algorithm includes an algorithm for predicting a spread path and a speed of the emergency situation,
   wherein the generating of the prediction data includes predicting, based on the spread path and the speed of the emergency situation, how long said each unit path included in the target region will remain safe, and
   the generating comprises generating the prediction data that includes information about time at which at least one of said each unit path becomes disabled,
   wherein the creating of the evacuation route includes
       disabling a unit path corresponding one from among unit paths included in the target region at the time; and
       re-generating the evacuation route while excluding the disabled unit path, wherein, in the creating of the evacuation route, the plurality of stations installed at different locations in the target region are configured as nodes, and the evacuation route is created based on a given graph in which travel paths present between some of the stations in the target region are configured as edges, wherein the creating of the evacuation route comprises generating a time-reflecting graph including Intergraph edges between nodes included in a previous unit time graph and a current unit time graph, based on the given graph to reflect the passage of time and adaptively create the current most efficient evacuation route over time, and wherein the evacuation route is further created by taking into consideration of a density of the objects corresponding to each node, the density being the number objects actually measured or predicted through past data, to enable a realistic and efficient search for the evacuation route that fits an actual evacuation situation in the target region.

2. The evacuation inducing method of claim 1, wherein the spread prediction algorithm includes an algorithm for predicting the pathway and speed of spread of the emergency situation, wherein, in the generating of prediction data, prediction data is generated that includes information on a point in time when at least one of the unit paths included in the target region is disabled depending on the pathway and speed of spread of the emergency situation.

3. The evacuation inducing method of claim 1, wherein the expected travel time is determined based on the time taken for the objects to travel along each unit path included in the target region.

4. The evacuation inducing method of claim 1, wherein the intergraph edges include:

a hold edge between a first node included in the previous unit time graph and a second node corresponding to the first node and included in the current unit time graph; and a path edge between at least one fourth node included in the current unit time graph and the first node, with the at least one fourth node corresponding to at least one third node between which and a node corresponding to the first node there exits an edge on the graph.

5. The evacuation inducing method of claim 1, wherein, in the initiating of guidance, guidance for distributing and evacuating the objects is initiated through a plurality of stations installed at different locations in the target region.

6. The evacuation inducing method of claim 1, further comprising updating the evacuation route by updating the prediction data, the degree of congestion on each unit path, and the expected travel time at preset unit time intervals.

* * * * *